US011468697B2

(12) United States Patent
Shao et al.

(10) Patent No.: US 11,468,697 B2
(45) Date of Patent: Oct. 11, 2022

(54) PEDESTRIAN RE-IDENTIFICATION METHOD BASED ON SPATIO-TEMPORAL JOINT MODEL OF RESIDUAL ATTENTION MECHANISM AND DEVICE THEREOF

(71) Applicant: Wuhan University, Wuhan (CN)

(72) Inventors: Zhenfeng Shao, Wuhan (CN); Jiaming Wang, Wuhan (CN)

(73) Assignee: WUHAN UNIVERSITY, Wuhan (CN)

(*) Notice: Subject to any disclaimer, the term of this patent is extended or adjusted under 35 U.S.C. 154(b) by 129 days.

(21) Appl. No.: 17/121,698

(22) Filed: Dec. 14, 2020

(65) Prior Publication Data

US 2021/0201010 A1 Jul. 1, 2021

(30) Foreign Application Priority Data

Dec. 31, 2019 (CN) .......................... 201911417821.4

(51) Int. Cl.
*G06V 40/10* (2022.01)
*G06F 17/18* (2006.01)
(Continued)

(52) U.S. Cl.
CPC ............ *G06V 40/103* (2022.01); *G06F 17/18* (2013.01); *G06K 9/6226* (2013.01); *G06K 9/6278* (2013.01); *G06V 10/92* (2022.01)

(58) Field of Classification Search
CPC ........ G06N 3/0454; G06N 3/08; G06N 3/084; G06N 3/0472; G06N 7/005; G06K 9/6256;
(Continued)

(56) References Cited

FOREIGN PATENT DOCUMENTS

CN 111738143 A * 10/2020 ......... G06K 9/00369
CN 111814584 A * 10/2020

OTHER PUBLICATIONS

Machine translation via Search of CN-111814584-A to Feng S, retrieved Jun. 10, 2022, 24 pages. (Year: 2022).*

(Continued)

*Primary Examiner* — Matthew C Bella
*Assistant Examiner* — Dennis Rosario
(74) *Attorney, Agent, or Firm* — Matthias Scholl P.C.; Matthias Scholl

(57) ABSTRACT

The disclosure provides a pedestrian re-identification method based on a spatio-temporal joint model of a residual attention mechanism and a device thereof. The method includes: performing feature extraction for an input pedestrian with a pre-trained ResNet-50 model; constructing a residual attention mechanism network including a residual attention mechanism module, a feature sampling layer, a global average pooling layer and a local feature connection layer; calculating a feature distance by using a cosine distance and denoting the feature distance as a visual probability according to the trained residual attention mechanism network; performing modeling for a spatio-temporal probability according to camera ID and frame number information in a pedestrian tag of a training sample, and performing Laplace smoothing for a probability model; and calculating a final spatio-temporal joint probability by using the visual probability and the spatio-temporal probability to obtain a pedestrian re-identification result.

16 Claims, 4 Drawing Sheets

(51) Int. Cl.
*G06K 9/62* (2022.01)
*G06V 10/88* (2022.01)

(58) Field of Classification Search
CPC ............ G06K 9/6232; G06K 9/00523; G06K 9/00496; G06K 9/6226; G06K 9/6277; G06K 9/6272; G06K 9/6269; G06K 9/627; G06K 9/6271; G06V 40/10; G06V 40/103; G06V 10/82; G06V 20/46; G06V 20/52; G06V 10/44; G06V 40/23; G06V 20/53; G06V 40/168; G06V 40/173; G06V 40/172; G06T 2207/20081; G06T 2207/20084; G06T 2207/30196; A61B 5/117
See application file for complete search history.

(56) References Cited

OTHER PUBLICATIONS

Machine translation via Search of CN 111738143 A to Chen W, retrieved Jun. 10, 2022, 16 pages. (Year: 2022).*

Zhang et al., Attention-aware scoring learning for person re-identification, Jun. 20, 2020 [retrieved Jun. 10, 2022], Knowledge-Based Systems, vol. 203, 11 pages. Retrieved: https://www.sciencedirect.com/science/article/pii/S0950705120303993 (Year: 2020).*

Chen et al., ABD-Net: Attentive but Diverse Person Re-Identification, Oct. 27-Nov. 2, 2019 [retrieved Jun. 10, 2022], 2019 IEEE/CVF International Conference on Computer Vision, pp. 8350-8360. Retrieved: https://ieeexplore.ieee.org/abstract/document/9008377 (Year: 2019).*

Zhang et al., SCAN: Self-and-Collaborative Attention Network for Video Person Re-Identification, Apr. 30, 2019 [retrieved Jun. 10, 2022], IEEE Transactions on Image Processing, vol. 28, Issue: 10, pp. 4870-4882. Retrieved: https://ieeexplore.ieee.org/abstract/document/8703416 (Year: 2019).*

Shen et al., End-to-End Deep Kronecker-Product Matching for Person Re-identification, Jun. 18-23, 2018 [retrieved Jun. 10, 2022], 2018 IEEE/CVF Conference on Computer Vision and Pattern Recognition, pp. 6886-6895. Retrieved: https://ieeexplore.ieee.org/abstract/document/8578818 (Year: 2018).*

Huan et al., Camera Network Based Person Re-identification by Leveraging Spatial-Temporal Constraint and Multiple Cameras Relations, Jan. 3, 2016 [retrieved Jun. 10, 2022], International Conference on Multimedia Modeling, Lecture Notes in Computer Science, vol. 9516, pp. 174-186. Retrieved: (Year: 2016) https://link.springer.com/chapter/10.1007/978-3-319-27671-7_15 (Year: 2016).*

* cited by examiner

PEDESTRIAN RE-IDENTIFICATION METHOD BASED ON SPATIO-TEMPORAL JOINT MODEL OF RESIDUAL ATTENTION MECHANISM AND DEVICE THEREOF

CROSS-REFERENCE TO RELATED APPLICATIONS

Pursuant to 35 U.S.C. § 119 and the Paris Convention Treaty, this application claims foreign priority to Chinese Patent Application No. 201911417821.4 filed Dec. 31, 2019, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure belongs to the technical field of pedestrian re-identification, and relates to a pedestrian re-identification method based on a spatio-temporal joint model of a residual attention mechanism and a device thereof.

High-quality human face pictures usually cannot be obtained by monitoring video due to a resolution and a shooting angle of a camera. Further, since pedestrians who often show multi-scale characteristics are very difficult to detect and identify, pedestrian re-identification becomes a very important alternative technology now. Pedestrian re-identification may realize across-device search based on given monitored pedestrian images, to effectively compensate for visual limitations of fixed-view cameras, and thus have important application values in the fields such as video monitoring, intelligent security and smart cities.

In recent years, with development of machine learning theory, deep-learning-based methods are widely used in computer vision tasks and obtain better performances than traditional manual design methods. However, in most of the existing methods of solving pedestrian re-identification problems, only pedestrian identity information in a tag is used, but camera ID information and spatio-temporal information such as a time sequence of an image and the frame number of an image in a video which are easily collected are neglected.

In the pedestrian re-identification method based on deep learning of a visual probability model and a spatio-temporal probability model, a visual probability is learned based on a deep learning network and fused with spatio-temporal probability information contained in prior information based on a Bayesian joint probability model.

SUMMARY

To overcome the shortcomings of the existing pedestrian re-identification technology, an object of the disclosure is to provide a new spatio-temporal joint model of a residual attention mechanism to implement a pedestrian re-identification method based on a Bayesian spatio-temporal joint model. The visual similarity of images is learned based on a spatio-temporal joint model of a residual attention mechanism, a spatio-temporal similarity is obtained by performing modeling for spatio-temporal information, and a pedestrian re-identification result is obtained by solving a joint probability with the optimized Bayesian joint model.

A pedestrian re-identification method based on a spatio-temporal joint model of a residual attention mechanism comprises:

a) performing feature extraction for an input pedestrian x with a ResNet-50 model obtained through pre-training to obtain a feature matrix denoted as f;

b) constructing a residual attention mechanism network with a network structure comprising a residual attention mechanism module, a feature sampling layer, a global average pooling layer and a local feature connection layer;

c) taking the feature matrix f with dimensions being H×W×C obtained in a) as an input of the residual attention mechanism network, and taking corresponding identity information y as a target output, where H, W, C refer to a length, a width and a channel number of a feature map respectively;

performing channel averaging for each spatial position of the feature matrix f as a spatial weight matrix according to the residual attention mechanism module; activating the spatial weight matrix by softmax to ensure that a convolution kernel learns different features, and calculating an attention mechanism map $M_{SA}$ to obtain a feature matrix $F_{RSA}$ with dimensions being H×W×C by $F_{RSA}=f*M_{SA}+f$;

d) sampling the feature matrix $F_{RSA}$ with dimensions being H×W×C into local feature matrixes ($F_{RSA_1}$, $F_{RSA_2}$, ..., $F_{RSA_6}$) with dimensions being $$\frac{H}{6} \times W \times C$$

by the feature sampling layer, and calculating local feature vectors ($V_{RSA_1}$, $V_{RSA_2}$, ..., $V_{RSA_6}$) by the global average pooling layer;

e) connecting the local features into a feature vector $V_{RSA}$ by the local feature connection layer, and calculating a cross entropy loss between the feature vector $V_{RSA}$ and the pedestrian identity y to obtain the trained residual attention mechanism network after training;

f) obtaining feature vectors $V_{RSA\text{-}\alpha}$ and $V_{RSA\text{-}\beta}$ corresponding to tested pedestrian images $x_\alpha$ and $x_\beta$ respectively according to the trained residual attention mechanism network obtained in e), and calculating a feature distance based on a cosine distance and denoting the feature distance as a visual probability $P_V$;

g) performing modeling for a spatio-temporal probability according to camera ID and frame number information in a pedestrian tag of a training sample, and calculating the spatio-temporal probability $P_{ST}$ according to the obtained spatio-temporal model; and h) calculating a final joint spatio-temporal probability using the visual probability $P_V$ obtained in f) and the spatio-temporal probability $P_{ST}$ obtained in g) to obtain a pedestrian re-identification result.

In c), the residual attention mechanism model is defined as follows:

$$Q(i, j) = \frac{\sum_{t=0}^{C} f_t(i, j)}{C}$$

$$M_{SA}(i, j) = \frac{e^{Q(i,j)}}{\Sigma(i, j) e^{Q(i,j)}}$$

$$F_{RSA_t}(i, j) = f_t(i, j) M_{SA}(i, j) + f_t(i, j),$$

where (i,j) refers to spatial position information, t refers to a channel serial number, $f_t(i,j)$ refers to a pixel point with the spatial position being (i,j) in the t-th channel of the feature matrix f, e refers to a base of a natural logarithm, and $F_{RSA}(i,j)$ refers to a pixel point with the spatial position being (i,j) in the feature matrix $F_{RSA}$.

In e), back propagation is performed by a stochastic gradient descent method to optimize residual attention mechanism network parameters until an upper limit of the number of training is reached, so that the trained residual attention mechanism network is obtained.

In g), Laplace smoothing is performed for a probability model after modeling is performed for the spatio-temporal probability according to the camera ID and frame number information in the pedestrian tag of the training sample.

In h), by using the visual probability $P_V$ obtained in f) and the spatio-temporal probability $P_{ST}$ obtained in g), the final joint probability is expressed as follows:

$$P = \frac{1}{1+\lambda_1 e^{-\gamma_1 P_V}} \frac{1}{1+\lambda_2 e^{-\gamma_2 P_{ST}}},$$

where $\lambda_1, \gamma_1, \lambda_2, \gamma_2$ refer to hyperparameters for balancing the visual probability and the spatio-temporal probability.

A pedestrian re-identification device based on a spatio-temporal joint model of a residual attention mechanism, comprising the following modules:

a first module, configured to perform feature extraction for an input pedestrian x with a ResNet-50 model obtained through pre-training so as to obtain a feature matrix denoted as f;

a second module, configured to construct a residual attention mechanism network with a network structure comprising a residual attention mechanism module, a feature sampling layer, a global average pooling layer and a local feature connection layer;

a third module, configured to obtain the feature matrix f with dimensions being H×W×C, take the feature matrix f as an input of the residual attention mechanism network, and take corresponding identity information y as a target output, where H, W, C refer to a length, a width and a channel number of a feature map respectively, and further configured to perform channel averaging for each spatial position of the feature matrix f as a spatial weight matrix according to the residual attention mechanism module, activate the spatial weight matrix by softmax to ensure that a convolution kernel learns different features, and calculate an attention mechanism map $M_{SA}$ to obtain a feature matrix $F_{RSA}$ with dimensions being H×W×C by $F_{RSA}=f*M_{SA}+f$;

a fourth module, configured to sample the feature matrix $F_{RSA}$ with dimensions being H×W×C into local feature matrixes ($F_{RSA_1}$, $F_{RSA_2}$, ..., $F_{RSA_6}$) with dimensions being $$\frac{H}{6} \times W \times C$$

by the feature sampling layer and calculate local feature vectors ($V_{RSA_1}$, $V_{RSA_2}$, ..., $V_{RSA_6}$) by the global average pooling layer;

a fifth module, configured to connect the local features into a feature vector $V_{RSA}$ by the local feature connection layer and calculate a cross entropy loss between the feature vector $V_{RSA}$ and the pedestrian identity y to obtain the trained residual attention mechanism network after training;

a sixth module, configured to obtain feature vectors $V_{RSA-\alpha}$ and $V_{RSA-\beta}$ corresponding to tested pedestrian images $x_\alpha$ and $x_\beta$ respectively according to the trained residual attention mechanism network obtained in e), and calculate a feature distance based on a cosine distance and denote the feature distance as a visual probability $P_V$;

a seventh module, configured to perform modeling for a spatio-temporal probability according to camera ID and frame number information in a pedestrian tag of a training sample and calculate the spatio-temporal probability $P_{ST}$ according to the obtained spatio-temporal model; and an eighth module, configured to calculate a final joint spatio-temporal probability by using the visual probability $P_V$ obtained by the sixth module and the spatio-temporal probability $P_{ST}$ obtained by the seventh module to obtain a pedestrian re-identification result.

In the third module, the residual attention mechanism module is defined as follows:

$$Q(i,j) = \frac{\sum_{t=0}^{C} f_t(i,j)}{C}$$

$$M_{SA}(i,j) = \frac{e^{Q(i,j)}}{\Sigma(i,j)e^{Q(i,j)}}$$

$$F_{RSA_t}(i,j) = f_t(i,j)M_{SA}(i,j) + f_t(i,j),$$

where (i,j) refers to spatial position information, t refers to a channel serial number, $f_t(i,j)$ refers to a pixel point with the spatial position being (i,j) in the t-th channel of the feature matrix f, e refers to a base of a natural logarithm, and $F_{RSA}(i,j)$ refers to a pixel point with the spatial position being (i,j) in the feature matrix $F_{RSA}$.

In the fifth module, back propagation is performed by a stochastic gradient descent method to optimize residual attention mechanism network parameters until an upper limit of the number of training is reached, so that the trained residual attention mechanism network is obtained.

In the seventh module, Laplace smoothing is performed for a probability model after modeling is performed for the spatio-temporal probability according to the camera ID and frame number information in the pedestrian tag of the training sample.

In the eighth module, by using the visual probability $P_V$ obtained by the sixth module and the spatio-temporal probability $P_{ST}$ obtained by the seventh module, the final joint probability is expressed as follows:

$$P = \frac{1}{1+\lambda_1 e^{-\gamma_1 P_V}} \frac{1}{1+\lambda_2 e^{-\gamma_2 P_{ST}}},$$

where $\lambda_1, \gamma_1, \lambda_2, \gamma_2$ refer to hyperparameters for balancing the visual probability and the spatio-temporal probability.

The disclosure solves a problem that prior spatio-temporal information in a camera network is neglected in the existing methods and obtains a more accurate pedestrian re-identification effect by fusing the traditional pedestrian re-identification method, and spatial information and a time difference of monitoring devices.

Compared with the existing method, advantages and positive effects of the disclosure are as follows: in an existing pedestrian re-identification method based on a convolutional neural network, local features and global features are generally extracted using a deep network, but determining points of interest of local features manually is complex and thus difficult to apply to big-data application scenarios; the advantages of the disclosure lie in optimizing network iteration using the residual attention mechanism network, accelerating convergence and seeking a solution with the optimized Bayesian joint probability so as to obtain a more accurate pedestrian re-identification.

BRIEF DESCRIPTIONS OF THE DRAWINGS

DETAILED DESCRIPTIONS OF EMBODIMENTS

A technical solution of the disclosure will be further described below in combination with drawings and examples.

An example of the disclosure provides a pedestrian re-identification method based on a spatio-temporal joint model of a residual attention mechanism, which is preferably performed in the following environment: a CPU of a server is Intel Xeon E5-2665, a GPU is NVIDIA GTX108Ti, an operating system is Ubuntu 16.04, and compiling environments are PyTorch 1.1.0, Python 3.5, CUDA9.0 and CUDNN7.1. During a specific implementation, a corresponding environment may be set according to requirements.

Figure 1:
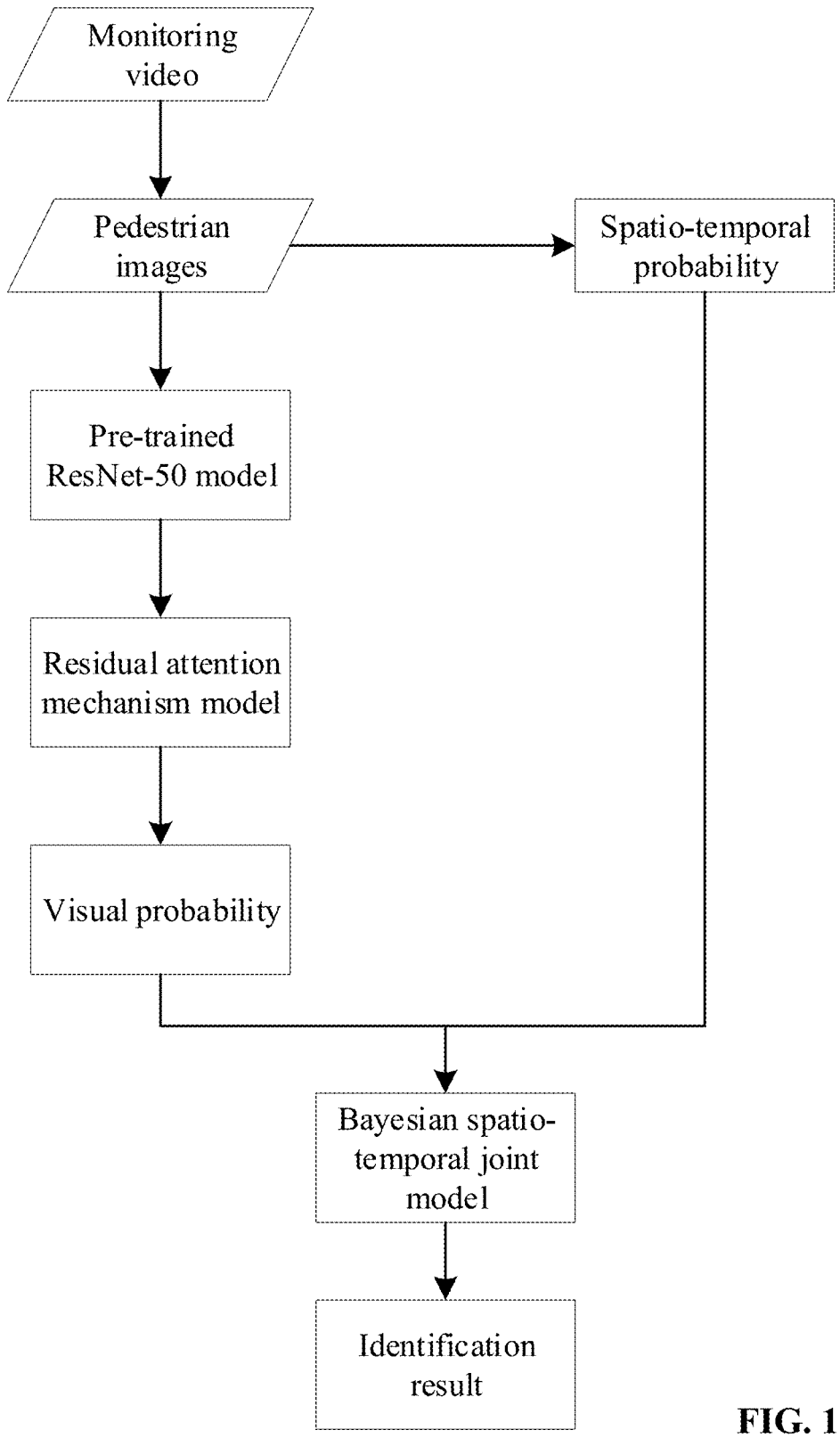
FIG. 1 is a flowchart of performing pedestrian re-identification based on a Bayesian spatio-temporal joint model according to an example of the disclosure.

As shown in FIG. 1, an example of the disclosure provides a pedestrian re-identification method based on a spatio-temporal joint model of a residual attention mechanism. An implementation process of the method is described as follows.

a) Feature extraction is performed for an input pedestrian x with a ResNet-50 model trained on the ImageNet data set to obtain a feature matrix denoted as f.

The ImageNet data set is a public data set, and the ResNet-50 model is the prior art, which are not described herein.

b) A residual attention mechanism network is constructed. In an example, the structure of the residual attention mechanism network is a residual attention mechanism module (Residual Spatial Attention, RSA)→a feature sampling layer→a Global Average Pooling layer (GAP)→a local feature connection layer (Concat). That is, the residual attention mechanism network comprises the residual attention mechanism module, the feature sampling layer, the global average pooling layer and the local feature connection layer which are all connected sequentially.

c) The feature matrix f with dimensions being H×W×C obtained in a) is taken as an input of the residual attention mechanism network, and corresponding identity information y is taken as a target output, where H, W, C refer to a length, a width and a channel number of a feature map respectively.

Figure 2:
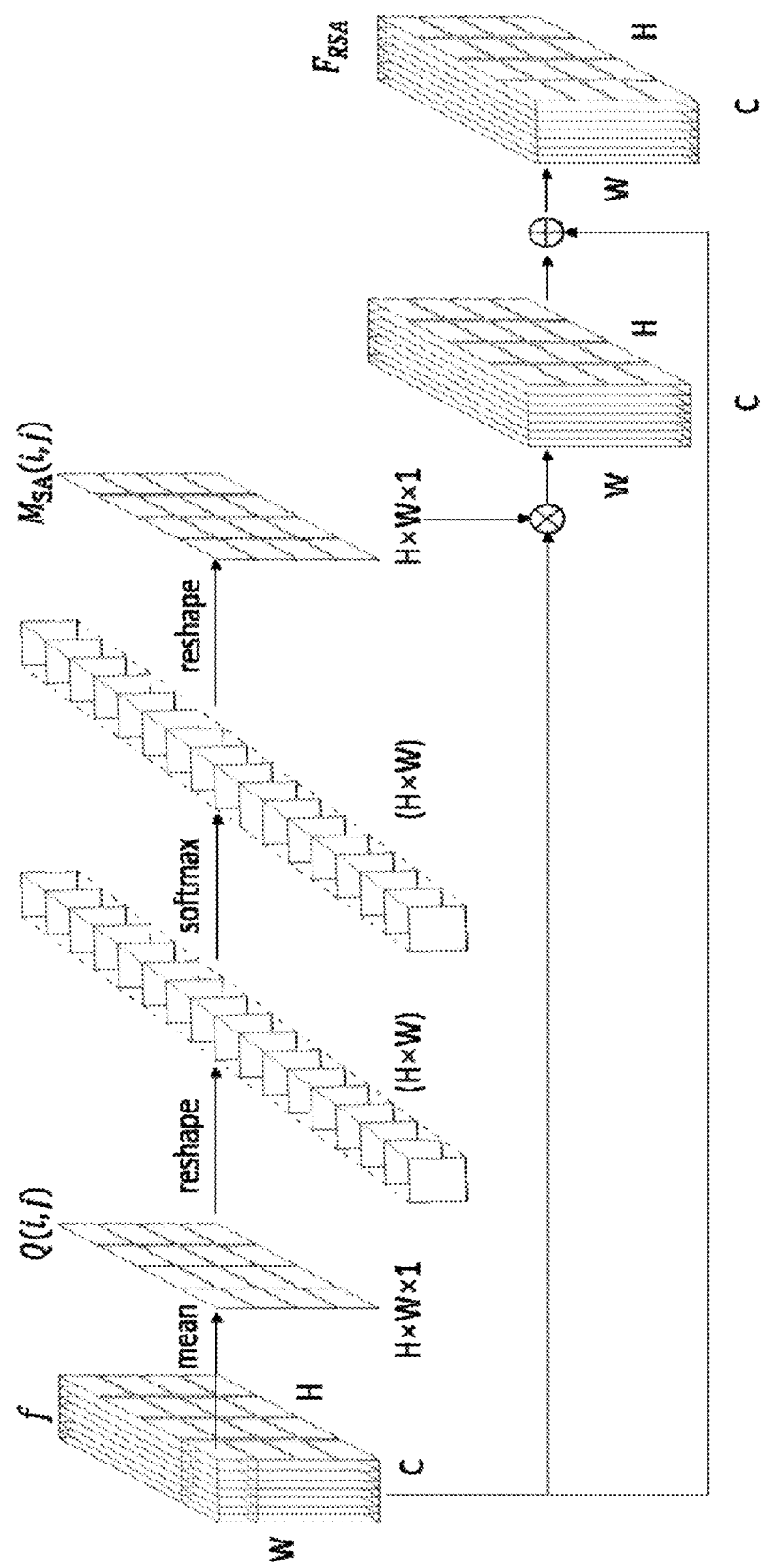
FIG. 2 is a schematic diagram illustrating a network structure of a residual attention mechanism module according to an example of the disclosure.

As shown in FIG. 2, a residual attention mechanism structure provided by the residual attention mechanism module in an example is as follows: a weight matrix is obtained by processing the feature matrix f through a mean operation and then reshaped into a vector, and the vector is activated by softmax to ensure that a convolution kernel learns different features and reshaped again to obtain an attention mechanism map. The attention mechanism map is multiplied by the input feature matrix f to obtain a product which is added to f to obtain a feature matrix $F_{RSA}$ with dimensions being H×W×C.

The mean operation is an averaging operation that performs channel averaging for each spatial position of the feature matrix f as a spatial weight matrix Q(i,j). The process is expressed by the following formula.

$$Q(i, j) = \frac{\sum_{t=0}^{C} f_t(i, j)}{C} \quad (1)$$

In the above formula, (i,j) refers to spatial position information, t refers to a channel serial number, and $f_t(i,j)$ refers to a pixel point with the spatial position being (i,j) in the t-th channel of the feature matrix f.

The reshape operation is a matrix dimension conversion operation that can convert a matrix with a size being H×W into a vector with a size being (H×W) or convert the vector with the size being (H×W) into the matrix with the size being H×W.

The softmax function activates the spatial weight vector to ensure that the convolution kernel learns different features. Then, the activated vector obtains an attention mechanism feature map $M_{SA}$ with dimensions being H×W×1 by means of the reshape operation. The process is expressed by the following formula.

$$M_{SA}(i, j) = \frac{e^{Q(i,j)}}{\Sigma(i, j) e^{Q(i,j)}} \quad (2)$$

In the above formula, (i,j) refers to spatial position information, e refers to a base of a natural logarithm, and H, W, C refer to the length, the width and the channel number of the feature map respectively.

The feature matrix $F_{RSA}$ with the dimensions being H×W×C is obtained by $F_{RSA}=f*M_{SA}+f$. The process is expressed by the following formula.

$$F_{RSA_t}(i,j)=f_t(i,j)M_{SA}(i,j)+f_t(i,j) \quad (3)$$

In the above formula, (i,j) refers to spatial position information, t refers to the channel number, $f_t(i,j)$ refers to a pixel point with the spatial position being (i,j) in the t-th channel of the feature matrix f, and $F_{RSA}(i,j)$ refers to a pixel point with the spatial position being (i,j) in the feature matrix $F_{RSA}$.

d) The feature matrix $F_{RSA}$ with the dimensions being H×W×C is divided into local feature matrixes $F_{RSA_1}$, $F_{RSA_2}$, ..., $F_{RSA_6}$ with dimensions being H/6×W×C, which corresponds to the operation of the feature sampling layer in b). Local feature vectors $V_{RSA_1}$, $V_{RSA_2}$, ..., $V_{RSA_6}$ are calculated by the global average pooling layer, which corresponds to the operation of the global average pooling layer (GAP) in b).

e) the local features are connected into a feature vector $V_{RSA}$, which corresponds to the operation of the local feature connection layer (Concat) in b), a cross entropy loss between the feature vector $V_{RSA}$ and the pedestrian identity y is calculated, back propagation is performed by a stochastic gradient descent method to optimize residual attention mechanism network parameters until an upper limit of the number of training is reached. In this way, a trained residual attention mechanism network is obtained.

In e), the local features are connected into the feature vector $V_{RSA}$, and thus $V_{RSA}$ may be expressed as follows:

$$V_{RSA} = \text{concat}(V_{RSA_1}, V_{RSA_2}, V_{RSA_3}, V_{RSA_4}, V_{RSA_5}, V_{RSA_6}) = (V_{RSA_1}, V_{RSA_2}, V_{RSA_3}, V_{RSA_4}, V_{RSA_5}, V_{RSA_6}) \quad (4).$$

In the above formula, $V_{RSA_1}, V_{RSA_2}, \ldots, V_{RSA_6}$ all refer to local feature vectors.

f) The feature vectors of tested pedestrian images $x_\alpha$ and $x_\beta$ are calculated as $V_{RSA-\alpha}$ and $V_{RSA-\beta}$ according to the trained residual attention mechanism network obtained in e). A feature distance $d(V_{RSA-\alpha}, V_{RSA-\beta})$ is calculated based on a cosine distance and denoted as a visual probability $P_V$. The calculation formula is as follows:

$$d(V_{RSA-\alpha}, V_{RSA-\beta}) = \frac{V_{RSA-\alpha} \cdot V_{RSA-\beta}}{\|V_{RSA-\alpha}\| \|V_{RSA-\beta}\|}. \quad (5)$$

In the above formula, $\|\cdot\|$ refers to an $l_2$ normal form of the feature vector.

g) A spatio-temporal probability is solved as follows: modeling is performed for the spatio-temporal probability according to camera ID and frame number information in a pedestrian tag of a training sample, and Laplace smoothing is then performed for a probability model.

According to spatio-temporal information carried in the image, the spatio-temporal probability $\overline{P}_{ST}$ ($p_\alpha = p_\beta | k, c_\alpha, c_\beta$) thereof is a probability that $\alpha, \beta$ are a same person under the condition of $k$, $c_\alpha$, $c_\beta$ and may be expressed as follows:

$$\overline{P}_{ST}(p_\alpha = p_\beta | k, c_\alpha, c_\beta) = \frac{n^k_{c_\alpha c_\beta}}{\Sigma_l n^l_{c_\alpha c_\beta}}. \quad (6)$$

In the above formula, $p_\alpha$, $p_\beta$ refer to identify information corresponding to images $\alpha$, $\beta$, and $c_\alpha$, $c_\beta$ refer to ID numbers of the corresponding cameras for shooting the images $\alpha$, $\beta$. k refers to a k-th time period (100 frames are one time period in an example). $n^k_{c_\alpha c_\beta}$ refers to the number of pedestrians from the camera $c_\alpha$ to the camera $c_\beta$ with a time difference falling in the k-th time period. $n^l_{c_\alpha c_\beta}$ refers to the number of pedestrians from the camera $c_\alpha$ to the camera $c_\beta$ with a time difference falling in the 1-th time period.

Since many jitters exist in a probability estimation model, smoothing is performed using a Laplace distribution function to reduce an interference caused by the jitters. The process is expressed as follows:

$$P_{ST}(p_\alpha = p_\beta | k, c_\alpha, c_\beta) = \frac{1}{Z} \Sigma_l \overline{P}_{ST}(p_\alpha = p_\beta | k, c_\alpha, c_\beta) K(1-k) \quad (7)$$

$$K(1-k) = \frac{1}{2\lambda} e^{\frac{-|1-k-\mu|}{\lambda}} \quad (8)$$

In the above formulas, $z = \Sigma_k P_{ST}(p_\alpha = p_\beta | k, c_\alpha, c_\beta)$ refers to a normalization factor, $K(.)$ refers to a Laplace distribution function, $\mu$ refers to a distribution offset control parameter which generally is 0, $\lambda$ refers to a distribution scaling control parameter which is recommended to be 50, and e refers to the base of the natural logarithm.

h) A final joint spatio-temporal probability is calculated using the visual probability $P_V$ obtained in f) and the spatio-temporal probability $P_{ST}$ obtained in g) so as to obtain a pedestrian re-identification result. The spatio-temporal probability and the visual probability are distributed independently, and a more accurate identification can be performed by constraining the visual probability using the spatio-temporal probability.

Since the spatio-temporal probability and the visual probability may differ in magnitude, it is required to balance the spatio-temporal probability and the visual probability by a sigmoid activation function. In h), by using the visual probability d obtained in f) and the spatio-temporal probability $P_{ST}$ obtained in g), a final joint probability $P_{joint}$ may be expressed as a Bayesian joint probability as follows:

$$P_{joint} = \frac{1}{1+\phi e^{-\gamma d}} \frac{1}{1+\phi e^{-\gamma P_{ST}}}. \quad (10)$$

In the above formula, $\lambda$, $\phi$ refer to hyperparameters for balancing the visual probability and the spatio-temporal probability, where $\gamma=5$, and $\phi$ is recommended to be in (50, 70).

At the above descriptions, a) is a data pre-processing part, b-e) are network training parts, f) is a network testing part, and g-h) are joint parts of the spatio-temporal probability and the visual probability.

In a specific implementation, the above flow may be realized as an automatic operation process by adopting a computer software technology, or may be provided in a modularized manner. Correspondingly, an example of the disclosure further provides a pedestrian re-identification device based on a spatio-temporal joint model of a residual attention mechanism. The device comprises the following modules.

A first module is configured to perform feature extraction for an input pedestrian x with a ResNet-50 model obtained through pre-training so as to obtain a feature matrix denoted as f.

A second module is configured to construct a residual attention mechanism network with a network structure comprising a residual attention mechanism module, a feature sampling layer, a global average pooling layer and a local feature connection layer.

A third module is configured to obtain the feature matrix f with dimensions being H×W×C take the feature matrix f as an input of the residual attention mechanism network, and corresponding identity information y as a target output, where H, W, C refer to a length, a width and a channel number of a feature map respectively.

According to the residual attention mechanism module, channel averaging is performed for each spatial position of the feature matrix f as a spatial weight matrix; the spatial weight matrix is activated by softmax to ensure that a convolution kernel learns different features, and an attention mechanism map $M_{SA}$ is calculated to obtain a feature matrix $F_{RSA}$ with dimensions being H×W×C by $F_{RSA} = f * M_{SA} + f$.

A fourth module is configured to sample the feature matrix $F_{RSA}$ with dimensions being H×W×C into local feature matrixes ($F_{RSA_1}$, $F_{RSA_2}$, ..., $F_{RSA_6}$) with dimensions being $$\frac{H}{6} \times W \times C$$

by the feature sampling layer and calculate local feature vectors ($V_{RSA_1}$, $V_{RSA_2}$, ..., $V_{RSA_6}$) by the global average pooling layer.

A fifth module is configured to connect the local features into a feature vector $V_{RSA}$ by the local feature connection layer and calculates a cross entropy loss between the feature vector $V_{RSA}$ and the pedestrian identity y so as to obtain the trained residual attention mechanism network after training.

A sixth module is configured to obtain feature vectors $V_{RSA-\alpha}$ and $V_{RSA-\beta}$ corresponding to test pedestrian images $x_\alpha$ and $x_\beta$ respectively according to the trained residual attention mechanism network obtained in e), and calculates a feature distance based on a cosine distance and denote it as a visual probability $P_V$.

A seventh module is configured to perform modeling for a spatio-temporal probability according to camera ID and frame number information in a pedestrian tag of a training sample and calculates the spatio-temporal probability $P_{ST}$ according to the obtained spatio-temporal model.

An eighth module is configured to calculate a final joint spatio-temporal probability using the visual probability $P_V$ obtained by the sixth module and the spatio-temporal probability $P_{ST}$ obtained by the seventh module so as to obtain a pedestrian re-identification result.

The implementation of each module may be referred to the above corresponding descriptions, and thus will not be described herein.

Figure 3:
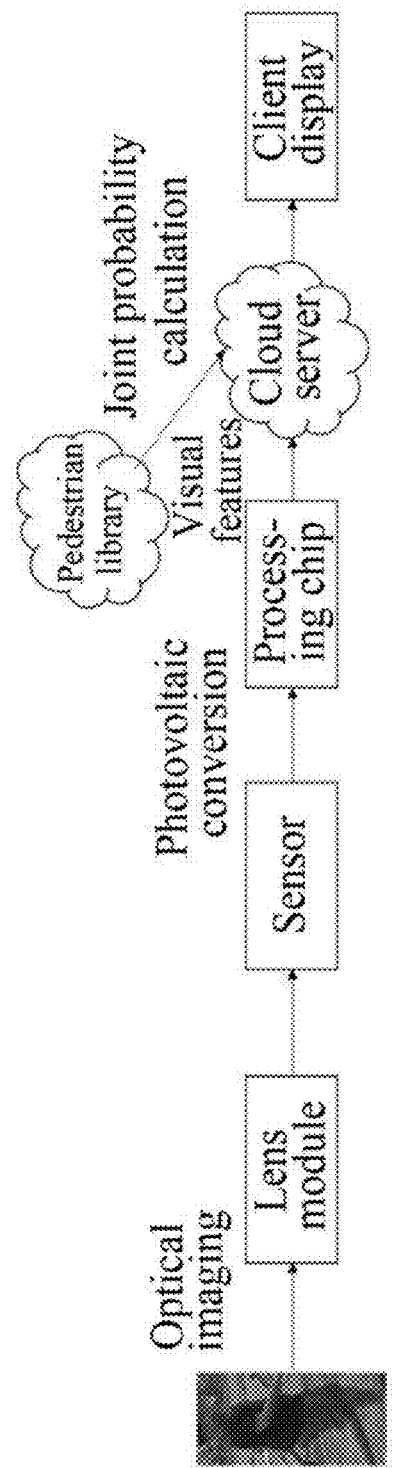
FIG. 3 is a schematic diagram illustrating an application device according to an example of the disclosure.
Figure 4:
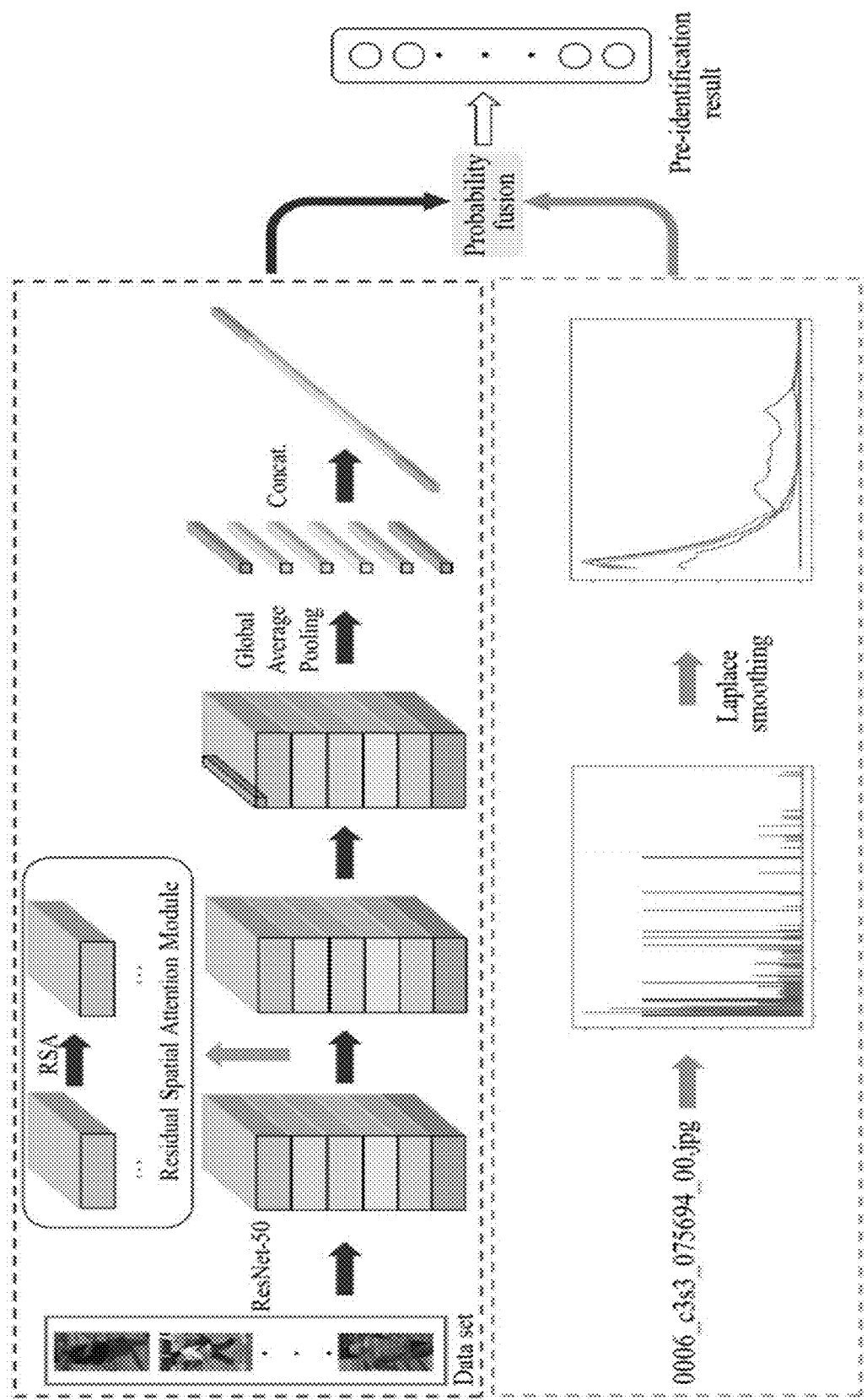
FIG. 4 is a structural diagram of pedestrian re-identification network based on spatio-temporal joint model of residual attention mechanism.

As shown in FIG. 3, in a specific implementation, the solution according to the disclosure may be applied in systems such as video monitoring. For example, a lens module may generate an optical image of a pedestrian, project the image onto a surface of a sensor and convert the image into an electrical signal; the sensor may convert the electrical signal into digital image information and input the information into a processing chip for intelligent calculation; the processing chip may extract spatio-temporal information from the image and input visual features of the image, which correspond to a-e) in the examples of the disclosure; in a cloud server, spatio-temporal pedestrian re-identification and joint probability calculation may be performed according to a pedestrian data set accessing a cloud, which corresponds to f-h) in the example of the disclosure. A client accepts the identification result and displays 10 persons most similar to the pedestrians shot by the camera as well as appearance time and appearance locations.

It will be obvious to those skilled in the art that changes and modifications may be made, and therefore, the aim in the appended claims is to cover all such changes and modifications.

What is claimed is:

1. A method, comprising:
a) performing feature extraction for an input pedestrian x with a ResNet-50 model obtained through pre-training to obtain a feature matrix denoted as f;
b) constructing a residual attention mechanism network with a network structure comprising a residual attention mechanism module, a feature sampling layer, a global average pooling layer and a local feature connection layer;
c) taking the feature matrix f with dimensions being H×W×C obtained in a) as an input of the residual attention mechanism network, and taking corresponding identity information y as a target output, wherein H, W, C refer to a length, a width and a channel number of a feature map, respectively;
performing channel averaging for each spatial position of the feature matrix f as a spatial weight matrix according to the residual attention mechanism module; activating the spatial weight matrix by softmax to ensure that a convolution kernel learns different features, and calculating an attention mechanism map $M_{SA}$ to obtain a feature matrix $F_{RSA}$ with dimensions being H×W×C by $F_{RSA}=f^*M_{SA}+f$;
d) sampling the feature matrix $F_{RSA}$ with dimensions being H×W×C into local feature matrixes ($F_{RSA_1}$, $F_{RSA_2}$, ..., $F_{RSA_6}$) with dimensions being $$\frac{H}{6} \times W \times C$$

by the feature sampling layer, and calculating local feature vectors ($V_{RSA_1}$, $V_{RSA_2}$ ... $V_{RSA_6}$) by the global average pooling layer;
e) connecting local features into a feature vector $V_{RSA}$ by the local feature connection layer, and calculating a cross entropy loss between the feature vector $V_{RSA}$ and the pedestrian identity y to obtain the trained residual attention mechanism network after training;
f) obtaining feature vectors $V_{RSA-\alpha}$ and $V_{RSA-\beta}$ corresponding to tested pedestrian images $x_\alpha$ and $x_\beta$ respectively according to the trained residual attention mechanism network obtained in e), and calculating a feature distance based on a cosine distance and denoting the feature distance as a visual probability $P_V$;
g) performing modeling for a spatio-temporal probability according to camera ID and frame number information in a pedestrian tag of a training sample, and calculating the spatio-temporal probability $P_{ST}$ according to the obtained spatio-temporal model; and
h) calculating a final joint spatio-temporal probability using the visual probability $P_V$ obtained in f) and the spatio-temporal probability $P_{ST}$ obtained in g) to obtain a pedestrian re-identification result.

2. The method of claim 1, wherein in c), the residual attention mechanism model is defined as follows:

$$Q(i, j) = \frac{\sum_{t=0}^{C} f_t(i, j)}{C}$$

$$M_{SA}(i, j) = \frac{e^{Q(i,j)}}{\Sigma(i, j)e^{Q(i,j)}}$$

$$F_{RSA_t}(i, j) = f_t(i, j)M_{SA}(i, j) + f_t(i, j),$$

wherein (i,j) refers to spatial position information, t refers to a channel serial number, $f_t(i,j)$ refers to a pixel point with the spatial position being (i,j) in a t-th channel of the feature matrix f, e refers to a base of a natural logarithm, and $F_{RSA}(i,j)$ refers to a pixel point with the spatial position being $(i,j)$ in the feature matrix $F_{RSA}$.

3. The method of claim 1, wherein in e), back propagation is performed by a stochastic gradient descent method to optimize residual attention mechanism network parameters until an upper limit of the number of training is reached, so that the trained residual attention mechanism network is obtained.

4. The method of claim 1, wherein in g), Laplace smoothing is performed for a probability model after modeling is performed for the spatio-temporal probability according to the camera ID and frame number information in the pedestrian tag of the training sample.

5. The method of claim 1, wherein in h), by using the visual probability $P_V$ obtained in f) and the spatio-temporal probability $P_{ST}$ obtained in g), the final joint probability is expressed as follows:

$$P = \frac{1}{1+\lambda_1 e^{-\gamma_1 P_V}} \frac{1}{1+\lambda_2 e^{-\gamma_2 P_{ST}}},$$

wherein $\lambda_1, \gamma_1, \lambda_2, \gamma_2$ refer to hyperparameters for balancing the visual probability and the spatio-temporal probability.

6. The method of claim 2, wherein in h), by using the visual probability $P_V$ obtained in f) and the spatio-temporal probability $P_{ST}$ obtained in g), the final joint probability is expressed as follows:

$$P = \frac{1}{1+\lambda_1 e^{-\gamma_1 P_V}} \frac{1}{1+\lambda_2 e^{-\gamma_2 P_{ST}}},$$

wherein $\lambda_1, \gamma_1, \lambda_2, \gamma_2$ refer to hyperparameters for balancing the visual probability and the spatio-temporal probability.

7. The method of claim 3, wherein in h), by using the visual probability $P_V$ obtained in f) and the spatio-temporal probability $P_{ST}$ obtained in g), the final joint probability is expressed as follows:

$$P = \frac{1}{1+\lambda_1 e^{-\gamma_1 P_V}} \frac{1}{1+\lambda_2 e^{-\gamma_2 P_{ST}}},$$

wherein $\lambda_1, \gamma_1, \lambda_2, \gamma_2$ refer to hyperparameters for balancing the visual probability and the spatio-temporal probability.

8. The method of claim 4, wherein in h), by using the visual probability $P_V$ obtained in f) and the spatio-temporal probability $P_{ST}$ obtained in g), the final joint probability is expressed as follows:

$$P = \frac{1}{1+\lambda_1 e^{-\gamma_1 P_V}} \frac{1}{1+\lambda_2 e^{-\gamma_2 P_{ST}}},$$

wherein $\lambda_1, \gamma_1, \lambda_2, \gamma_2$ refer to hyperparameters for balancing the visual probability and the spatio-temporal probability.

9. A device, comprising:
a first module, configured to perform feature extraction for an input pedestrian x with a ResNet-50 model obtained through pre-training so as to obtain a feature matrix denoted as f;
a second module, configured to construct a residual attention mechanism network with a network structure comprising a residual attention mechanism module, a feature sampling layer, a global average pooling layer and a local feature connection layer;
a third module, configured to obtain the feature matrix f with dimensions being H×W×C, take the feature matrix f as an input of the residual attention mechanism network, and take corresponding identity information y as a target output, wherein H, W, C refer to a length, a width and a channel number of a feature map respectively, and further configured to perform channel averaging for each spatial position of the feature matrix f as a spatial weight matrix according to the residual attention mechanism module, activate the spatial weight matrix by softmax to ensure that a convolution kernel learns different features, and calculate an attention mechanism map $M_{SA}$ to obtain a feature matrix $F_{RSA}$ with dimensions being H×W×C by $F_{RSA}=f*M_{SA}+f$;
a fourth module, configured to sample the feature matrix $F_{RSA}$ with dimensions being H×W×C into local feature matrixes ($F_{RSA_1}, F_{RSA_2}, \ldots, F_{RSA_6}$) with dimensions being $$\frac{H}{6} \times W \times C$$

by the feature sampling layer and calculate local feature vectors ($V_{RSA_1}, V_{RSA_2}, \ldots, V_{RSA_6}$) by the global average pooling layer;
a fifth module, configured to connect the local features into a feature vector $V_{RSA}$ by the local feature connection layer and calculate a cross entropy loss between the feature vector $V_{RSA}$ and the pedestrian identity y to obtain the trained residual attention mechanism network after training;
a sixth module, configured to obtain feature vectors $V_{RSA-\alpha}$ and $V_{RSA-\beta}$ corresponding to tested pedestrian images $x_\alpha$ and $x_\beta$ respectively according to the trained residual attention mechanism network obtained in e), and calculate a feature distance based on a cosine distance and denote the feature distance as a visual probability $P_V$;
a seventh module, configured to perform modeling for a spatio-temporal probability according to camera ID and frame number information in a pedestrian tag of a training sample and calculate the spatio-temporal probability $P_{ST}$ according to the obtained spatio-temporal model; and
an eighth module, configured to calculate a final joint spatio-temporal probability by using the visual probability $P_V$ obtained by the sixth module and the spatio-temporal probability $P_{ST}$ obtained by the seventh module to obtain a pedestrian re-identification result.

10. The device of claim 9, wherein in the third module, the residual attention mechanism module is defined as follows:

$$Q(i,j) = \frac{\sum_{t=0}^{C} f_t(i,j)}{C}$$

$$M_{SA}(i,j) = \frac{e^{Q(i,j)}}{\Sigma(i,j)e^{Q(i,j)}}$$

$$F_{RSA_t}(i,j) = f_t(i,j)M_{SA}(i,j) + f_t(i,j),$$

wherein (i,j) refers to spatial position information, t refers to a channel serial number, $f_t(i,j)$ refers to a pixel point with the spatial position being (i,j) in the t-th channel of the feature matrix f, e refers to a base of a natural logarithm, and $F_{RSA}(i,j)$ refers to a pixel point with the spatial position being (i,j) in the feature matrix $F_{RSA}$.

11. The device of claim 9, wherein in the fifth module, back propagation is performed by a stochastic gradient descent method to optimize residual attention mechanism network parameters until an upper limit of the number of training is reached, so that the trained residual attention mechanism network is obtained.

12. The device of claim 9, wherein in the seventh module, Laplace smoothing is performed for a probability model after modeling is performed for the spatio-temporal probability according to the camera ID and frame number information in the pedestrian tag of the training sample.

13. The device of claim 9, wherein in the eighth module, by using the visual probability $P_V$ obtained by the sixth module and the spatio-temporal probability $P_{ST}$ obtained by the seventh module, the final joint probability is expressed as follows:

$$P = \frac{1}{1+\lambda_1 e^{-\gamma_1 P_V}} \frac{1}{1+\lambda_2 e^{-\gamma_2 P_{ST}}},$$

wherein $\lambda_1, \gamma_1, \lambda_2, \gamma_2$ refer to hyperparameters for balancing the visual probability and the spatio-temporal probability.

14. The device of claim 10, wherein in the eighth module, by using the visual probability $P_V$ obtained by the sixth module and the spatio-temporal probability $P_{ST}$ obtained by the seventh module, the final joint probability is expressed as follows:

$$P = \frac{1}{1+\lambda_1 e^{-\gamma_1 P_V}} \frac{1}{1+\lambda_2 e^{-\gamma_2 P_{ST}}},$$

wherein $\lambda_1, \gamma_1, \lambda_2, \gamma_2$ refer to hyperparameters for balancing the visual probability and the spatio-temporal probability.

15. The device of claim 11, wherein in the eighth module, by using the visual probability $P_V$ obtained by the sixth module and the spatio-temporal probability $P_{ST}$ obtained by the seventh module, the final joint probability is expressed as follows:

$$P = \frac{1}{1+\lambda_1 e^{-\gamma_1 P_V}} \frac{1}{1+\lambda_2 e^{-\gamma_2 P_{ST}}},$$

wherein $\lambda_1, \gamma_1, \lambda_2, \gamma_2$ refer to hyperparameters for balancing the visual probability and the spatio-temporal probability.

16. The device of claim 12, wherein in the eighth module, by using the visual probability $P_V$ obtained by the sixth module and the spatio-temporal probability $P_{ST}$ obtained by the seventh module, the final joint probability is expressed as follows:

$$P = \frac{1}{1+\lambda_1 e^{-\gamma_1 P_V}} \frac{1}{1+\lambda_2 e^{-\gamma_2 P_{ST}}},$$

wherein $\lambda_1, \gamma_1, \lambda_2, \gamma_2$ refer to hyperparameters for balancing the visual probability and the spatio-temporal probability.

* * * * *